UNITED STATES PATENT OFFICE.

GEORGE W. HASTINGS, OF GRAFTON, ASSIGNOR TO EDMUND M. WOOD, OF NATICK, MASSACHUSETTS.

POLISHING COMPOUND.

SPECIFICATION forming part of Letters Patent No. 404,483, dated June 4, 1889.

Application filed July 2, 1888. Serial No. 278,849. (Specimens.)

*To all whom it may concern:*

Be it known that I, GEORGE W. HASTINGS, a citizen of the United States, residing at Grafton, in the county of Worcester and State of Massachusetts, have invented certain new and useful Improvements in Polishing Compounds; and I do hereby declare the following to be a full, clear, and exact description of the invention, such as will enable others skilled in the art to which it appertains to make and use the same.

This invention relates to polishing compounds, more particularly that class termed "bottom burnish," which is especially designed for the soles of boots and shoes, to aid in imparting a high finish and polished appearance to the bottom surface.

The object of my invention is to produce a compound which shall be cheap; furthermore, one which is easy of application, and after such application will produce a better surface, the latter being more glass-like and capable of retaining its high luster after a lapse of time. To this end I form the base of this improved polishing compound of carnauba-wax. With this is mixed ozocerite, crude or refined. The carnauba-wax is hard and brittle; hence the addition of the ozocerite, which is employed to assist in tempering the carnauba-wax and renders the latter capable of being more easily applied. To the above ingredients I also add spirits turpentine, to which are joined French chalk and oil of citronella. The above ingredients are thoroughly commingled to form a homogeneous mass by subjecting them to a proper degree of heat.

In the manufacture of this improved polishing compound I prefer to employ the above-specified ingredients in the following proportions: ten pounds carnauba-wax, ten pounds ozocerite, crude or refined, three pounds spirits turpentine, two ounces dry French chalk, and four ounces of oil of citronella.

I do not desire to be limited to the exact proportions hereinabove stated, as the ingredients may be compounded somewhat differently and yet produce good results.

After being subjected to heat sufficient to melt the wax, and when thoroughly mixed, the compound is to be poured into suitable forms or molds, where it is allowed to cool. After removal therefrom it is then in a suitable form and condition for application to the soles of boots and shoes.

Of this polishing compound but a small quantity is required for a large surface, while the luster and polish are exceedingly high, the compound producing a hard finish, which will retain its glass-like appearance for a long time.

What I desire to claim is—

As an improved article of manufacture, a polishing compound composed of carnauba-wax, ozocerite, crude or refined, spirits turpentine, French chalk, and oil of citronella, substantially as herein set forth and described.

In testimony whereof I affix my signature in presence of two witnesses.

GEORGE W. HASTINGS.

Witnesses:
H. E. LODGE,
EDMUND M. WOOD.